Patented Nov. 30, 1937

2,100,545

UNITED STATES PATENT OFFICE 2,100,545

WELDING ELECTRODE

Hugo W. Hiemke, Milwaukee, Wis., assignor to A. O. Smith Corporation, Milwaukee, Wis., a corporation of New York No Drawing. Application August 16, 1934, Serial No. 740,117

2 Claims. (Cl. 219—8)

This invention relates to electrodes for use in metallic arc welding and more specifically to electrodes of the covered type for the welding of nickel and nickel alloys.

The invention provides a covering for use on arc welding electrodes composed of nickel or essentially non-ferrous alloys high in nickel content which insures a weld deposit of sound metal of approximately the character of the base metal of which the electrode is composed and possessing high tensile strength and ductility.

It is important in the arc welding of nickel and its alloys that the metal be deposited under controlled conditions which not only insures that the metal be formed in the weld as a dense deposit, but also insures that the desirable physical characteristics of such metal shall not be sacrificed by the action of the arc upon it or otherwise during the process of welding.

It has been found that if the electrode core of nickel or nickel alloy be provided with a covering made by the employment of the following ingredients, excellent results are obtained in the use of such electrode in electric arc welding in which said electrode constitutes one terminal of the welding arc, and the work to be welded the other terminal of such welding arc:

| | Parts by weight |
|---|---|
| Titanium oxide | 12 |
| Wood flour | 13 |
| Ferro-manganese | 6 |
| Sodium silicate | 42 |

It is preferable to mix the dry ingredients first, then mix the same with the sodium silicate to form a plastic mass and extrude the same upon the weldrod core, after which the whole is baked to form a hard coating.

In the place of the wood flour, other forms of carbohydrate materials may be employed, such, for instance, as starch, cotton, or the straw of wheat and the like.

The sodium silicate employed in the illustration given above was of 42° Baumé gravity. Sodium silicate may be added in other densities or dry with enough water to form a plastic mass.

Other ingredients may be added without losing the benefits obtained by the above-recited covering. For example, 3 parts of silica flour ($SiO_2$) and two parts of magnesium oxide (MgO) have been added to the above constituents without materially altering the results obtained in welding. As an illustration of a desirable covering thickness on a weldrod core of ¼" diameter, a covering thickness of $\frac{1}{32}$" has been found to be satisfactory.

By the use of the above-described covering on a practically pure nickel weldrod, a weld deposit was obtained having a tensile strength of 65,000 lbs. per square inch, and a ductility sufficient to give an elongation of the weld metal of 36% in two inches.

The employment of this covering upon a Monel metal electrode core gave a weld deposit of between 75,000 and 80,000 lbs. per square inch tensile strength and a ductility expressed by an elongation of 36% in two inches. The composition of this weldrod core was approximately 67% nickel, 30% copper, and the remainder iron, manganese and silicon.

Welds made in the above manner withstand corrosive effects equally as well as the parent metal to be deposited.

It is to be understood that the constituents recited may vary somewhat in their proportions without destroying the benefits of the invention. However, it is preferred to employ the same in about the proportions recited above.

I claim:

1. A covered electrode for metallic arc welding consisting of a metal rod of nickel or nickel alloy, and a heavy covering thereon comprising about 12 parts of titanium oxide, about 13 parts of wood flour, about 6 parts of ferro-manganese all by weight, and an additional amount of silica bearing compound to protect the wood flour from premature decomposition and to enter into the slag.

2. A covered electrode for metallic arc welding comprising a metal rod of nickel or nickel alloy, and a heavy covering for giving desirable welding characteristics thereto, said covering containing as its principal constituents carbohydrate material, titanium oxide, sodium silicate, ferro-manganese, silica flour, and magnesium oxide, the carbohydrate material, titanium oxide, ferromanganese, silica flour and magnesium oxide being incorporated in approximately the proportions by weight of 13, 12, 6, 3 and 2, respectively, the sodium silicate being employed in sufficient quantity to produce a plastic mass.

HUGO W. HIEMKE.